United States Patent [19]

Coulon et al.

[11] Patent Number: 4,770,867

[45] Date of Patent: Sep. 13, 1988

[54] PROCESS FOR THE PRODUCTION OF CARBON FIBRES WHICH ARE VAPOR-DEPOSITED FROM METHANE

[75] Inventors: Michel Coulon, Taverny, France; Najib Kandani, Jnane Chekouri - Safi, Morocco; Lucien Bonnetain, St Martin D'Uriage; Jacques Maire, Paris, both of France

[73] Assignee: Le Carbone-Lorraine, France

[21] Appl. No.: 836,167

[22] PCT Filed: May 9, 1985

[86] PCT No.: PCT/FR85/00110

§ 371 Date: Jan. 9, 1986

§ 102(e) Date: Jan. 9, 1986

[87] PCT Pub. No.: WO85/05383

PCT Pub. Date: Dec. 5, 1985

[30] Foreign Application Priority Data

May 10, 1984 [FR] France .................................. 84 07823

[51] Int. Cl.$^4$ ............................ D01F 9/12; D01F 9/14
[52] U.S. Cl. ............................... 423/447.3; 423/447.5; 423/453; 423/458; 423/461; 502/183; 502/185
[58] Field of Search ................... 423/447.3, 447.5, 453, 423/458, 461; 502/183, 185

[56] References Cited

U.S. PATENT DOCUMENTS

| | | | |
|---|---|---|---|
| 4,391,787 | 7/1983 | Tibbetts | 423/458 |
| 4,565,684 | 1/1986 | Tibbetts et al. | 423/458 |

FOREIGN PATENT DOCUMENTS

| | | | |
|---|---|---|---|
| 50-64527 | 5/1975 | Japan | 423/447.1 |
| 56-118913 | 9/1981 | Japan | 423/447.3 |
| 59-59921 | 4/1984 | Japan | 423/447.3 |

OTHER PUBLICATIONS

Tamai et al., Carbon Deposition on Iron and Nickel Sheets From Light Hydrocarbons, Carbon, 1968, vol. 6, pp. 593–602.

Koyama et al., Carbon Fibers Obtained by Thermal Decomposition of Vaporized Hydrocarbons, Japanese Journal of Applied Physics, vol. 11, No. 4, 4/72, 445–9.

*Primary Examiner*—John Doll
*Assistant Examiner*—Robert M. Kunemund
*Attorney, Agent, or Firm*—Jones, Day, Reavis & Pogue

[57] ABSTRACT

The invention concerns a process for the production of vapor-deposited carbon fibres wherein a gaseous or vaporized hydrocarbon which is entrained by a carrier gas is pyrolyzed on a substrate in a flow reactor at a temperature of between 950° and 1300° C. in two successive stages, a germination stage and a growth stage.

The process comprises the following steps:

preparing a gaseous mixture comprising from 50 to 90% and preferably from 85 to 65% by volume of hydrogen and/or helium and from 10 to 40% and preferably from 15 to 35% by volume of methane;

circulating the mixture in the reactor over a substrate comprising from $10^{-8}$ to $10^{-4}$ g/cm$^2$ of a catalyst selected from iron, nickel, cobalt and alloys thereof;

initiating germination and growth of the carbon fibres in respect of length at a temperature t1 which is stabilized at between 950° and 1050° C., with a substantially constant velocity of the gaseous mixture of between 10 and 50 centimeters per minute for a period of between 10 and 90 minutes;

causing growth of the carbon fibres in respect of diameter at a temperature t2 which is higher than 1050° C. and which can attain approximately 1300° C., with a progressively increasing velocity of the gaseous mixture; and cooling the reactor under an inert gas before extracting the carbon fibres.

10 Claims, No Drawings

PROCESS FOR THE PRODUCTION OF CARBON FIBRES WHICH ARE VAPOR-DEPOSITED FROM METHANE

The invention concerns a process for the production of carbon fibres which are vapour-deposited from methane.

At the present time, carbon fibres are produced virtually entirely by pyrolysis of polyacrylonitrile fibres (referred to as P.A.N. fibres). That method is relatively easy to carry out and it affords the advantage of producing fibres which are as long as may by desired. On the other hand, the diameter of the fibres produced is governed by that of the initial P.A.N. fibre and in most cases it is around 7 to 10 $\mu$m.

Two other processes have been the subject of investigation: one is referred to as "ex-mesophase fibres", which comprises starting from pitch which is run out into thread form, then oxidised, carbonised and graphitised, being described for example in French patent No. 2 512 076 (MITSUI) and EP-A-No. 27739 (Union Carbide), the other being referred to as the process "by vapour-deposition"; the vapour-deposition process comprises producing fibres by thermal decomposition of a hydrocarbon on a substrate on which catalyst particles have been deposited.

The principles of that process were described by L. Meyer, Zeit.Krist. 109 (1957), pages 61 and 67, Hillert and Lange, Zeit. Krist. 111 (1958), pages 24–34, and then by Endo (Doctorate thesis, Orleans, 1975) and J. Cryst.Growth 32, 335 (1976) who showed that those fibres could be produced in a controlled and economic fashion, and explained the mechanism thereof, which splits up into a catalytic effect followed by a pyrolitic effect. It is for that reason that reference is sometimes made to "CC" fibres (catalytic carbon fibres) to denote those products.

The process developed by Endo to produce fibres in large amounts and of substantial lengths comprises passing a hydrogen-benzene mixture without preheating into a cylindrical reactor containing a substrate (a tube of graphite, ceramic . . . ), the surface of which has been activated by the deposit of metal particles. The reactor is in a tubular furnace which subjects it to a temperature gradient from 950° C. to 1100° C. The size of the fibres is highly sensitive to the heating gradient, the total flow rate, the composition of the gases and the geometry of the reactor. Depending on the conditions under which the preparation operation is carried out, the diameter of the fibres varies from a few thousands of Angstroms to a few tens of microns, while the length varies from a few centimeters to a few tens of centimeters. The fibres produced in that way have a breaking stress of 1 to 3 GPa, a Young's modulus of 200 to 300 GPa and an electrical resistivity of $10^{-3}$ $\Omega$.cm.

Japanese patent application (KOKAI-No. 51/33210 Showa-Denko) describes a process for the preparation of carbon fibres by vapour-deposition from a mixture of hydrogen and a cyclic hydrocarbon (benzene, toluene) or an aliphatic hydrocarbon (ethane or octane) in a quartz reactor at a temperature of from 1030° to 1300° C.

Germination is effected for a period of 10 to 30 seconds with a gas velocity of S×(100 to 1500) cm per minute, wherein S is the cross sectional area of the tube in square centimeters; the growth of the fibres occurs with a gas velocity of 10 to 30 centimeters per minute, in from 30 to 180 minutes. That process makes it possible to produce fibres which are from 7 to 50 $\mu$m in diameter and from 30 to 180 mm in length. That patent does not refer to the presence of a catalyst.

Japanese patent application KOKAI No. 57/117662 (published on July 22, 1982) in the name of SHOWA-DENKO describes a method which is similar to that referred to above, with a catalyst selected from refractory materials in groups 4A, 5A, 6A and 8 and more particularly: Ti, Zr, V, Nb, Cr, Mo and Mn.

The same catalysts had already been claimed in a previous Japanese patent application in the name of SHOWA-DENKO (KOKAI No. 52/103528 published on 30 th August 1977) with a preference for Fe, Co, Ni, V, Nb and Ta, the hydrocarbon being selected from benzene, toluene, methane, ethane, propane, butane, propylene and cyclohexane, the carrier gas being hydrogen or argon.

At the present time, those processes have not yet made it possible to carry out mass production on an industrial scale, as certain parameters have not been completely mastered.

The subject of the present invention is a process for the production of vapour-deposited carbon fibres wherein methane which is entrained by a carrier gas is pyrolysed on a substrate in a flow reactor at a temperature of from 950° to 1300° C. in two successive stages, a germination stage and a growth stage, the process comprising:

1. preparing a gaseous mixture comprising from 90 to 60% and preferably from 85 to 65% by volume of hydrogen and/or helium and from 10 to 40% and preferably from 15 to 35% by volume of methane;

2. circulating said mixture in the reactor over a substrate comprising from $10^{-8}$ to $10^{-4}$ g/cm$^2$ of a catalyst selected from iron, nickel, cobalt or alloys of those metals;

3. beginning germination and growth in respect of length of the carbon fibres at a temperature t1 which is stabilised at between 950° and 1050° C. with a substantially constant velocity of the gaseous mixture of between 10 and 50 centimeters per second, for a period of between 10 and 90 minutes;

4. causing the growth in respect of diameter of the carbon fibers at a temperature t2 which is higher than 1050° C. and which may reach approximately 1300° C., with a progressively increasing velocity of the gaseous mixture; and 5. cooling the reactor under inert gas before extracting the carbon fibers.

The features and embodiments which will be described herein after will make it possible clearly to specify the various parameters of the invention.

1. THE REACTOR

Operation is effected in a reactor formed by a tube of refractory material such as quartz which has an inside diameter of 35 mm and which is 1 meter in length, being heated by an electrical resistance-type furnace in which the rate of rise in temperature may be controlled by a microprocessor in such a way that it may vary linearly in dependence on time between the two temperatures t1 and t2, which rate may be selected for example (but without limitation) at a value of from 0.5 to 5° C. per minute, with the temperatures t1 and t2 being between 950 and 1300° C.; that limit is imposed by the resistance and the service life of the quartz tube but it does not constitute a limitation on the process. The active part of the reactor in which the production of the carbon fibers will be effected is formed by a substrate which is positioned in the central zone of the quartz tube where the temperature is hcmogenous.

Three types of substrates are used:
quartz (in the form of a thin sheet)
a tube of polycrystalline graphite of fine grain type, which is coaxial and in contact with the quartz tube, and
"Papyex" which is produced by Le Carbone-Lorraine, by rolling exfoliated graphite, in the form of a sheet of 0.27 mm in thickness (specific gravity 0.7), which is wound into tube form and inserted into the quartz tube.

2. THE CATALYST

This is a metal based on iron, nickel, cobalt or an alloy of those metals and which is deposited on the substrate by various means such as:

substrate rubbed with abrasive paper on which iron filings were deposited, impregnation by a suspension of NiO in acetone with a level of concentration $c = 5.10^{-4} g.cm^{-3}$, deposit of an Fe-Co alloy (for example containing 37.5% by weight of cobalt in iron) by rubbing the substrate with an ingot of that alloy which itself has been previously rubbed with emery paper so as to remove fine particles therefrom (the above-indicated proportion of 37.5% of Co is not a limiting characteristic), and deposit of iron by cathodic pulverisation. That procedure involves volatilising the particles to be deposited by bombardment of a target by means of a flux of ions which are accelerated from a gas plasma.

The deposits of Fe which are produced by that procedure are of estimated thicknesses of 25, 150 and 300 Å.

impregnation of the "Papyex" by a solution of iron nitrate in ethanol. The levels of concentration used vary from $8 . 10^{-5} g.cm^{-3}$ to $0.1 g. cm^{-3}$. By means of a micropipette, a volume of the nitrate solution ranging from 0.4 to 0.6 cm³ is deposited on the papyex in as regular a fashion as possible. The mass of iron per unit of surface area of the substrate is calculated on the basis of the concentration and the volume of the solution deposited on the substrate. It corresponds to values ranging from $3.5 . 10^{-8} g/cm^2$ to $4 . 10^{-5} g/cm^2$. Equivalent results were obtained by immersing the papyex in the alcohol solution.

In practice, the optimum levels of concentration of catalysts resulting in satisfactory reproducible production of fibers are between $1 . 10^{-8}$ and $1 . 10^{-4}$ grams per cm² of substrate.

3. THE HYDROCARBON AND THE CARRIER GAS

It has been found that methane gave substantially superior results to those achieved with the other hydrocarbons as regards the yield and the lower level of sensitivity to the nature of the catalyst: that process makes it possible by simple impregnation with iron nitrate to achieve yields which, in the state of the art defined by the prior patents, make it necessary to use a catalyst in the form of heat-stable particles, measuring 300 Å, produced by a very delicate evaporation process (Japanese patent application KOKAI No. 57/117662); the situation is the same as regards regularity and control of the different parameters of the process. The carrier gas is preferably helium or hydrogen or a mixture of the two thereof.

4. OPERATING CONDITIONS

The velocity, temperature and composition of the gaseous mixture are determining factors.

Composition:

The most favourable compositions occur between 90 and 60 and preferably between 85 and 65% of helium and/or hydrogen and between 10 and 40 and preferably between 15 and 35% by volume of methane.

Temperature:

The optimum temperature for the phase involving germination and growth in respect of length is between 950° and 1050° C. The optimum temperature of the phase for growth in respect of diameter occurs as from 1050° C and up to 1300° C. without that value being an absolute limit. The temperature of the germination phase corresponds to the optimum formation of an optimum fiber "density" which is in the region of $10^3$ fibers per cm² of surface area of carrier, which density then goes to and stabilises at $10^4$–$10^5$ fibers/cm² at the beginning of the phase involving growth in respect of diameter.

Velocity

If the velocity of the gaseous mixture is relatively low, a condition of thermal equilibrium occurs rapidly as soon as it passes into the quartz tube and the gases reach the reaction temperature in the active zone where the catalyst is disposed. That is the case when the velocity is lower than 20 centimeters per minute. At a higher velocity, it is necessary to provide an arrangement to facilitate the transfer of heat between the quartz tube and the gas, for example a plug of carbon felt which is disposed in the first third of the quartz tube, at the gas intake end. It is also possible, upstream of the reactor, to provide a separate furnace for preheating the gas to a temperature that is at least equal to 500° C.

By virtue of the rate of transformation of the gases (pyrolysis of the methane) which increases greatly in the course of the growth of the fibers in respect of diameter, it is necessary to increase the flow rate and therefore the velocity of the gases. The transformation rate essentially depends on the length of the furnace, the density of the fibers, the number of fibers per cm² of sectional area of the reactor and the total surface area developed by the fibers. That is multiplied by at least 1000 in the course of the growth phase.

The possible increase in velocity is then limited by the heat flux provided by the gases. That finishes by cooling the furnace to a prohibitive degree for velocities of higher than 40 centimeters per minute at 1100° C.

In practice, the optimum conditions for carrying out the process are as follows:

the duration of the phase for germination and growth in respect of length of the fibers is between 30 and 90 minutes for a temperature of from 950° to 1000° C. and from 10 to 30 minutes for a temperature of from 1000° to 1050° C. , and the velocity of the gaseous mixture during that phase is stabilised at between 10 and 50 centimeters per minute;

the phase involving growth in respect of diameter is effected with a rate of rise in temperature of between 0.5° and 5° C. per minute from the germination temperature t1 to the growth temperature t2;

the velocity of the gaseous mixture during the phase of growth of the fibers in respect of diameter is progressively increased from an initial value that is at least equal to 10 centimeters per minute to a final value that can attain 400 centimeters per minute; and the duration of the phase of growth of the fibers in respect of diameter is between 30 and 120 minutes at a temperature of from 1050° to 1300° C., for a final fibre diameter of from 10 to 20 micrometers.

The rate of rise in temperature in the initial phase of the process (germination) has a strong influence on the carbon yield (expressed as the ratio in % of carbon introduced into the reactor in the form of methane, to the carbon which is recovered in the form of fiber). The overall yield of the process may for example vary from 3% to 15% when the rate of rise in temperature increases in a ratio of 1 to 8 (for example from 0.5° to 4° C. per minute).

EXAMPLE 1

In the reactor as described hereinbefore, which is fed with a gaseous mixture comprising 85% helium +15% methane (by volume) at a total flow rate of 180 cm$^3$ per minute and an iron nitrate catalyst on a "PAPYEX" substrate, the procedure comprised:

preheating the furnace under a flow of hydrogen to 950° C., stabilising the temperature at 95° C., introducing the helium-methane gas mixture, and effecting germination and growth of the fibers in respect of length for a period of 15 minutes (at 950° C.).

At that moment, the fibers produced were about 70 mm in length and from 5 to 20 nm in diameter, at a density of the order of 400 fibers per square centimeter of useful cross sectional area of the reactor.

The phase for growth of the fibers in respect of diameter (and for completion of the growth in length) was then initiated by increasing the temperature from 950° to 1150° C. at a linear rate of 1° C. per minute. Germination continued to a temperature of about 1050° C. and the fiber density went to $\sim 10^3/\text{cm}^2$.

When the temperature reached 1150° C., the mean diameter of the fibers had reached approximately 30 micrometers and the length had reached 70 to 90 millimeters.

Heating of the furnace was then stopped and the furnace was left to cool under an inert low-cost gas such as nitrogen, in order to remove the fibers.

EXAMPLE 2

Using the same reactor, the same operations as described above in Example 1 were carried out, but with the following gas mixture: hydrogen 65%, methane 35% (by volume), with a total flow rate of 200 cm$^3$ per minute.

The increase in temperature from 950° to 1150° C. was effected at a linear rate of 4° C. per minute.

At the end of the operation, the fiber density was $10^5/\text{cm}^2$, while the mean diameter was 2 micrometers.

EXAMPLE 3

Using the same reactor, the same operations as described above in Example 1 were carried out but using a gaseous mixture of hydrogen 80% and methane 20% (by volume), with a total flow rate of 250 cm$^3$ per minute. The increase in temperature was effected at a linear rate of 1° C. per minute. A fibre density of $10^3/\text{cm}^2$ was obtained, with a mean diameter of 20 micrometers.

The fibers produced by the process according to the invention may then be subjected to a thermal graphitation treatment under an inert gas at a temperature of the order of 2800° to 320° C. for a period of between 15 minutes and 2 hours. The characteristics of the fibers are as follows:

(a) Mechanical characteristics:

Before heat treatment:

Breaking stress: 1 to 2 GPa } for a diameter of 40 to 7 micrometers
Young's modulus: 100 to 300 GPa After heat treatment Breaking stress: 2 to 3 GPa
Young's modulus: unchanged.

(b) Electrical characteristics
Resistivity in $10^3 \Omega \cdot$ cm in the direction of length

|  | 40 μm fibers | 7 μm fibers |
| --- | --- | --- |
| Before heat treatment | 3.5 | 0.8 |
| After heat treatment | 0.080 | 0.045 |
| After insertion of an electron acceptor+ | 0.008 | 0.004 |

N.B. Electrical resistance crosswise is 1000 to 10,000 times higher

+The insertion of an electron acceptor such as FeCl$_3$ in the carbon fibers is known per se (cf C. HERINCKH, R. PERRET, W. RULAND, CARBON, 10, pages 711-722, 1972).

The very low levels of resistivity which, after insertion, are at the same level as those of metal conductors, had never been achieved using fibers from other hydrocarbons such as benzene. In addition, that gives rise to the hope of using the fibers produced by the process according to the invention as electrical conductors and thus confirms the originality of the present invention.

We claim:

1. A process for the production of vapor-deposited carbon fibers wherein a gaseous or vaporized hydrocarbon which is entrained by a carrier gas is pyrolyzed on a substrate in a flow reactor at a temperature of between 950° and 1300° C. in two successive stages, a germination stage and a growth stage, said process comprising the steps of:

(a) preparing a gaseous mixture comprising from 50 to 90% by volume of a gas selected from the group consisting of hydrogen, helium and mixtures thereof, and from 10 and 40% by volume of methane;

(b) circulating the mixture in the reactor over a substrate comprising from $10^{-8}$ to $10^{-4}$ g/cm$^2$ of a catalyst selected from the group consisting of iron, nickel, cobalt and alloys thereof;

(c) initiating germination and growth of the carbon fibers in respect of length by heating the reactor to a temperature t1 which is stabilised at between 950° and 1050° C., and maintaining a substantially constant velocity of the gaseous mixture of between 10 and 50 centimeters per minute, for a period of between 10 and 90 minutes;

(d) causing growth of the carbon fibers in respect of diameter at a temperature t2 which is higher than 1050° C. and which can attain approximately 1300° C., by progressively increasing the velocity of the gaseous mixture and progressively increasing the temperature of the reactor from the germination temperature t1 to the growth temperature t2 at a rate of rise in temperature of between 0.5 and 5° C. per minute; and (e) cooling the reactor under an inert gas before extracting the carbon fibers.

2. A process according to claim 1 wherein the duration of the phase for germination and growth in respect of length of the fibers is between 30 and 90 minutes for a temperature of 950° to 1000° C. and between 10 and 30 minutes for a temperature of 950° to 1050° C.

3. A process according to claim 1 wherein the velocity of the gaseous mixture during the phase of growth of the fibers in respect of diameter is progressively increased from an initial value that is at least equal to 10 centimeters per minute to a final value which may attain 400 centimeters per minute.

4. A process according to claim 1 wherein the duration of the growth of the fibers in respect of diameter is between 30 and 120 minutes at a temperature of between 1050° and 1300° C., for a final fiber diameter of between 10 and 20 crometers.

5. A process according to claim 1 wherein, before reaching the substrate, the gaseous mixture is preheated to a temperature that is at least equal to 500° C.

6. A process according to claim 5 wherein the gaseous mixture is preheated in an auxiliary furnace disposed upstream of the reactor.

7. A process according to claim 5 wherein the gaseous mixture is preheated by passing over a heat exchanger which is disposed at the intake of the reactor and which is formed for example by a graphite or carbon felt plug.

8. A process according to claim 1 wherein the substrate is formed by a sheet of graphite such as "PAPYEX".

9. A process according to claim 1 wherein the fibers, after the end of the growth stage, are graphitised at a temperature of between 2800° and 3200° C. under an inert atmosphere for a period of between 15 minutes and 1 hour.

10. A process according to claim 1 wherein the gaseous mixture comprises from 85 to 65% by volume of hydrogen and/or helium and from 15 to 35% by volume of methane.

* * * * *